United States Patent
Stevenson et al.

(10) Patent No.: US 6,753,619 B2
(45) Date of Patent: Jun. 22, 2004

(54) FLY-WHEEL-BASED REGENERATIVE ENERGY MANAGEMENT SYSTEM

(75) Inventors: Randy Stevenson, Saline, MI (US); Zhesheng Li, Dearborn Heights, MI (US); Carl Klaes, Livonia, MI (US); Mahmoud Abdel-haq, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 70 days.

(21) Appl. No.: 10/214,213

(22) Filed: Aug. 6, 2002

(65) Prior Publication Data

US 2004/0026927 A1 Feb. 12, 2004

(51) Int. Cl.[7] .................................................. H02P 9/04
(52) U.S. Cl. .............................. 290/1 R; 322/4; 310/74
(58) Field of Search ............................... 290/1 R, 1 A, 290/40 C; 322/4; 310/74

(56) References Cited

U.S. PATENT DOCUMENTS

| | | | |
|---|---|---|---|
| 2,443,770 A | 6/1948 | Kasschau ...................... 180/65 |
| 4,411,171 A | 10/1983 | Fiala ........................... 74/675 |
| 4,495,451 A | 1/1985 | Barnard ....................... 318/150 |
| 4,499,965 A | 2/1985 | Oetting et al. ................ 180/165 |
| 4,629,947 A | 12/1986 | Hammerslag et al. ........ 318/161 |
| 5,826,673 A | 10/1998 | Bates et al. .................. 180/165 |
| 5,839,533 A | 11/1998 | Mikami et al. ............... 180/165 |
| 5,932,935 A | * 8/1999 | Clifton et al. ................ 307/60 |
| 5,969,457 A | * 10/1999 | Clifton et al. ............... 310/216 |
| 5,998,899 A | * 12/1999 | Rosen et al. ................ 310/90.5 |
| 6,040,634 A | 3/2000 | Larguier ....................... 290/45 |
| 6,073,712 A | 6/2000 | Buglione .................... 180/65.2 |
| 6,144,128 A | 11/2000 | Rosen ......................... 310/74 |
| 6,175,172 B1 | 1/2001 | Bakholdin et al. ............ 310/74 |
| 6,232,671 B1 | 5/2001 | Gottfried, Jr. ............... 290/1 R |
| 6,249,069 B1 | 6/2001 | Krueger ....................... 310/74 |
| 6,262,505 B1 | * 7/2001 | Hockney et al. ........... 310/90.5 |
| 6,278,194 B1 | * 8/2001 | Nakagawa et al. ........... 290/31 |
| 6,294,886 B1 | 9/2001 | Gibard ........................ 318/161 |
| 6,355,987 B1 | * 3/2002 | Bixel .......................... 290/52 |
| 6,392,311 B2 | * 5/2002 | Inaba et al. ............... 290/38 R |
| 2001/0004174 A1 | 6/2001 | Gallant | |

* cited by examiner

*Primary Examiner*—Nicholas Ponomarenko
(74) *Attorney, Agent, or Firm*—Brinks Hofer Gilson & Lione

(57) ABSTRACT

The present invention includes a novel regenerative energy management system having a flywheel assembly with an integrated motor-generator which is coupled to a drivetrain motor-generator. The coupling between the flywheel assembly and the drivetrain motor-generator includes a system controller having integrated voltage control and inverters. The flywheel of the present invention avoids the use of expensive bearings, vacuum systems, cooling systems, and other such support subsystems found in other high technology flywheels. The integration of the flywheel-motor-generator system saves valuable space within the vehicle, reduces the number of bearings necessary for operation, and simplifies the coupling of the flywheel motor generator to the flywheel. The system controller has integrated inverters and voltage control that determine the direction and flow of current between the flywheel assembly and the driveline motor-generator.

16 Claims, 4 Drawing Sheets

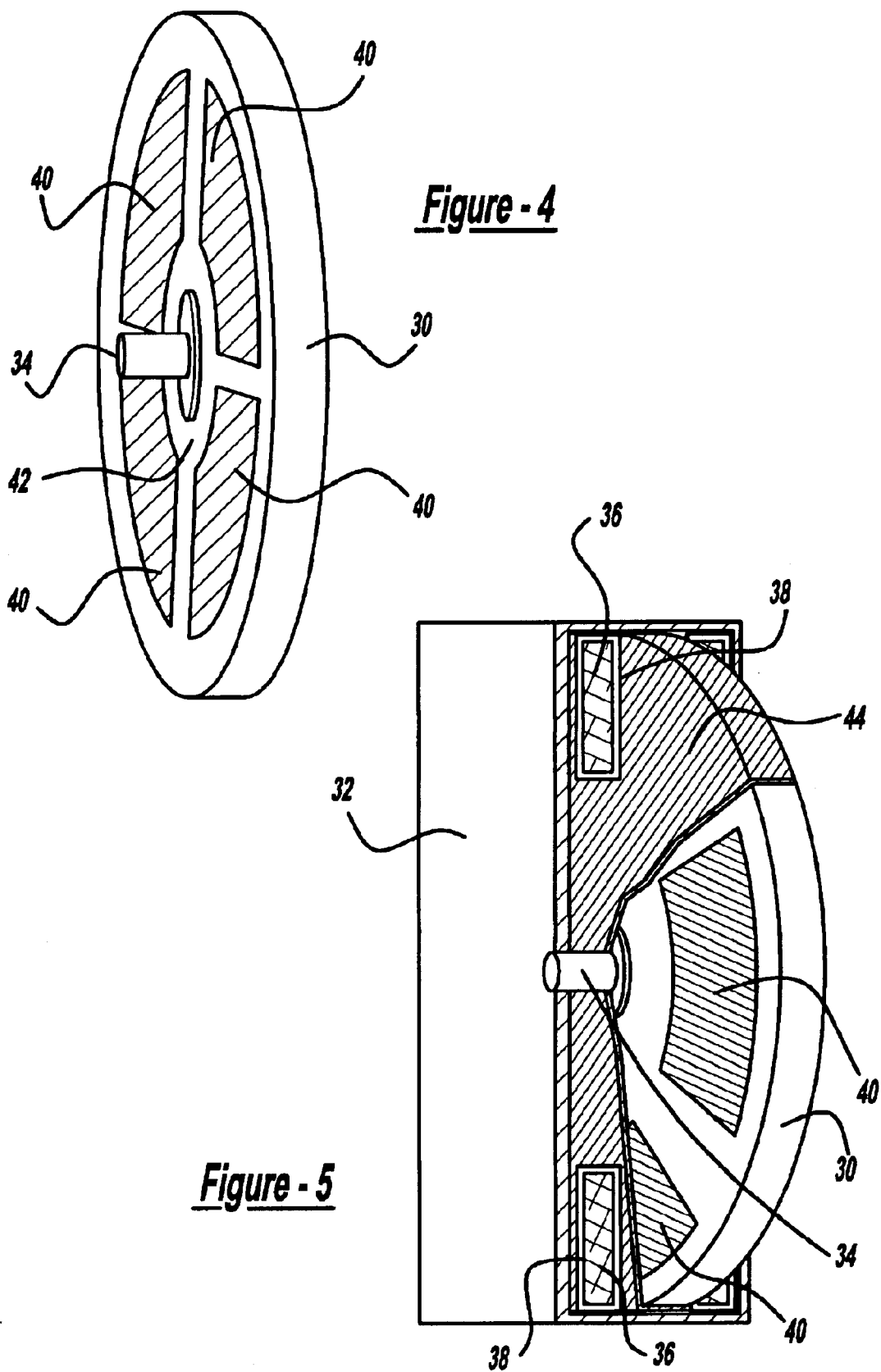

FLY-WHEEL-BASED REGENERATIVE ENERGY MANAGEMENT SYSTEM

BACKGROUND OF THE INVENTION

1. Technical Field of the Invention

The present invention relates to kinetic energy storage systems for use in moving vehicles. More particularly, the present invention relates to energy storage systems utilizing an integrated fly-wheel-motor-generator coupled to a system controller and further coupled to a drivetrain motor/generator for use in a hybrid vehicle.

2. Description of the Prior Art

While flywheels are well known in the art there has been little application of flywheels in moving vehicles. In particular, there has been little application of flywheels used as kinetic energy stores in automobiles. In spite of this lack of usage it is highly desirable to utilize flywheel systems to store kinetic energy and moving vehicles since they can be loaded and energy drawn many times. For example, a train equipped with a kinetic energy storing flywheel could serve a significant portion of that energy which was lost upon stopping the train. Similarly, the energy wasted in stopping an automobile, such as a bus or a taxi cab, could also be conserved and applied to accelerating the automobile for supplying the automobile with electrical power. Such a kinetic energy storage system could have vast application in the field of electric automobiles or electric-internal combustion hybrid automobiles.

The automobile environment however, presents special challenges in successful implementation of a flywheel to motor vehicle applications. Among these challenges is the need to deal with gyroscopic torques resulting from the vehicle's angular motions and need to accommodate the translational accelerations of the vehicle. Additionally, several safety Issues resulting from the high energy and momentum stored in the flywheel also need to be taken into account, as does the difficulty of cooling the motor generator operating in a vacuum chamber. In addition, energy conservation considerations and user convenience dictate the requirement that the flywheel storage system possess a slow self-discharge rate.

While there have been many developments in flywheel technology in particular with respect to flywheel energy storage in a motor vehicle many of these developments have not overcome the aforementioned limitations in flywheel design. For example, U.S. Pat. No. 4,499,965 to Oetting et al. describes a hybrid drive arrangement utilizing a storage flywheel that allows a fast response to sudden increases in power demand while simultaneously providing for kinetic energy storage upon braking of the vehicle. However, as is common in most hybrid drive arrangements the flywheel is coupled separately to the vehicle crankshaft and the motor-generator which serves to store and/or transmit the energy inherent in the rotating flywheel. This arrangement entails separately manufactured flywheel disposed within a flywheel housing :which in turn is coupled to the motor generator. This standard design limits the packaging options within a hybrid vehicle in that the flywheel assembly and the motor-generator unit must be separately packaged. This inefficient packaging results in an increase in weight to the vehicle and the likely increase in the cost of assembly and maintenance of the vehicle.

Therefore, there is a need in the art for a flywheel assembly that is inexpensive, easily packaged, and adaptable for efficient use in a hybrid or electric vehicle drivetrain, for example, in a regenerative energy management system.

SUMMARY OF THE INVENTION

The present invention includes a novel regenerative energy management system having a flywheel assembly with an integrated motor-generator which is coupled to a drivetrain motor-generator. The coupling between the flywheel assembly and the drivetrain motor-generator includes a system controller having integrated voltage control and inverters. The present invention efficiently enables a vehicle to capture the kinetic energy resulting from a braking event storing this energy and then re-using the stored energy for subsequent acceleration.

For example, during a braking event most of the kinetic energy of a typical hybrid vehicle is converted to heat energy through the friction brakes. Conversely, the present system is designed to gather kinetic energy from a braking event utilizing the generator component of a drivetrain motor-generator unit. The resultant electrical current is transmitted to the system controller, where the current is modulated and distributed to a plurality of metal windings in the flywheel assembly. The current-carrying metal windings interact electromagnetically with a plurality of magnets joined to a flywheel within the flywheel assembly, such that the flywheel begins to rotate, thus storing that braking kinetic energy by spinning up the flywheel.

If the vehicle begins to accelerate, then stored kinetic energy can then be released using the generator portion of the integrated flywheel motor-generator. In this instance, the system controller inverts the flow of electrical current such that the magnets on the spinning flywheel electromagnetically induce a current in the metal windings within the flywheel assembly. The induced current is then distributed through the system controller where it is modulated and directed to the motor part of the drivetrain motor-generator which accelerates the vehicle.

In order to perform as described the present invention includes an inexpensive and optimized flywheel. Because a vehicle entering a braking event would generate a known kinetic energy the flywheel has a maximum rotational speed predetermined. Thus, the flywheel of the present invention avoids the use of expensive bearings, vacuum systems, cooling systems, and other such support subsystems found in other high technology flywheels. Because the flywheel is designed to have a maximum kinetic energy and a maximum rotational speed the moment of inertia of the flywheel may be optimized. By constraining the radius of the flywheel, an optimized shape that minimizes the flywheel mass while ensuring that the stress within the flywheel does not exceed safe bounds can be determined.

Secondly, the present invention includes the incorporation of a motor generator directly into the flywheel. The integration of the system saves valuable space within the vehicle, reduces the number of bearings necessary for operation, and simplifies the coupling of the flywheel motor generator to the flywheel.

Thirdly, the system controller having integrated inverters and voltage control determines the direction and flow of current between the flywheel assembly and the driveline motor-generator.

BRIEF DESCRIPTION OF THE DRAWINGS

FIG. 4 depicts an optimized flywheel showing the powder metal magnets in accordance with a preferred embodiment of the present invention; and FIG. 5 is a partial cutaway of the flywheel assembly of the present invention, showing a titanium retention cover for the powder metal magnets in accordance with a preferred embodiment of the present invention.

DETAILED DESCRIPTION OF THE PREFERRED EMBODIMENT

Figure 1:
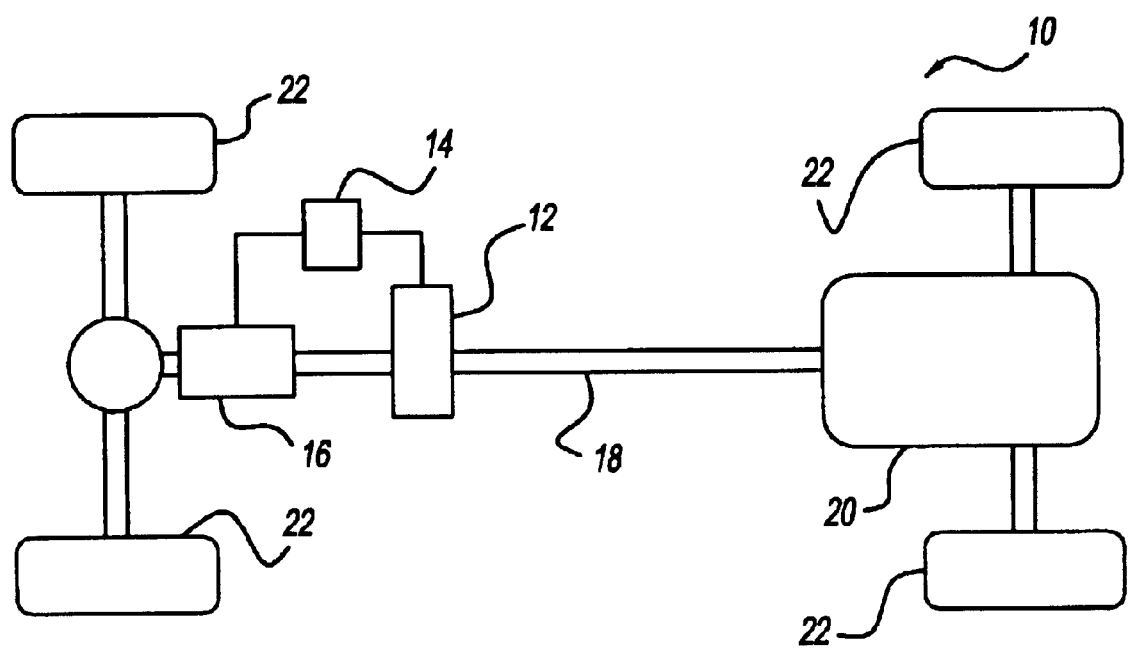
FIG. 1 is a schematic block diagram of the hybrid vehicle drivetrain of the present invention.

In accordance with a preferred embodiment of the present invention, FIG. 1 shows a schematic block diagram of a hybrid vehicle utilizing the regenerative energy management system 10 of the present invention. The regenerative energy management system 10 includes a driveline motor-generator 16 electromechanically coupled to a vehicle driveline 18. The vehicle driveline 18 is mechanically coupled to an internal combustion engine 20, which serves to provide at least part of the propulsion for al, set of vehicle wheels 22. The driveline motor-generator 16 is electrically coupled to a system controller 14, which is in turn electrically coupled to a flywheel assembly 12.

Figure 2:
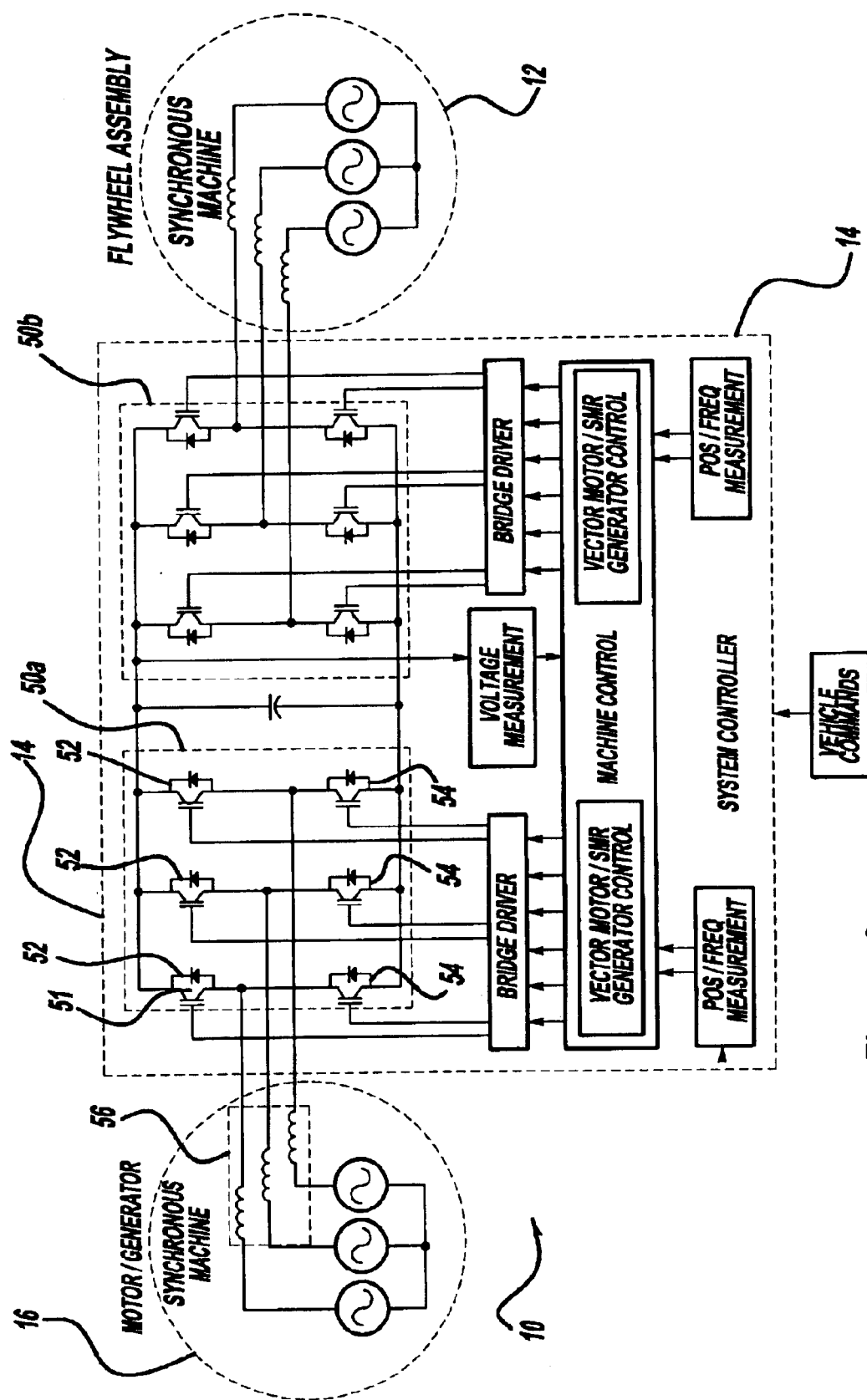
FIG. 2 is a schematic diagram of the regenerative energy management system of the present invention.
Figure 3:
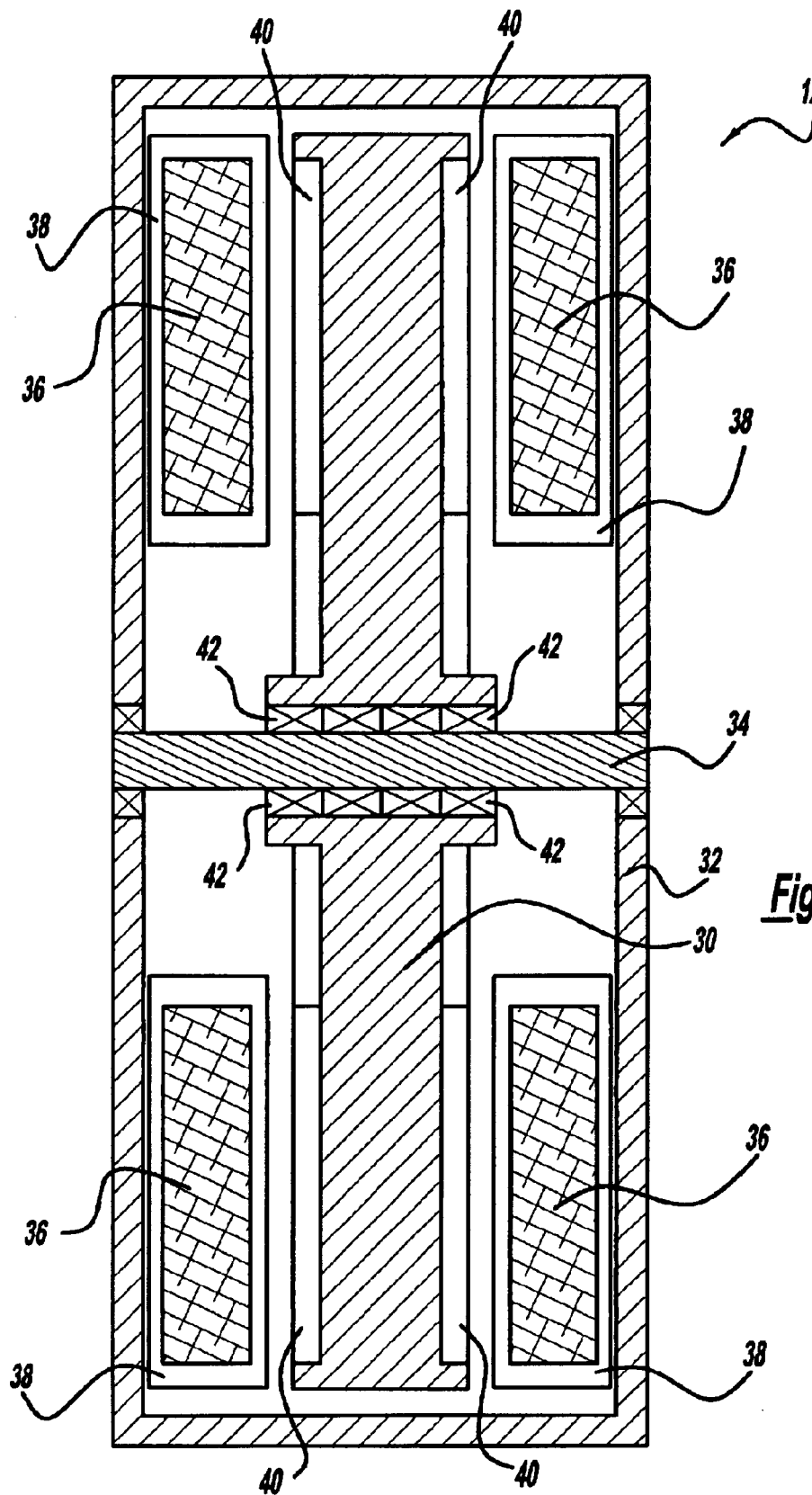
FIG. 3 is a schematic cross-sectional view of the integrated flywheel motor generator of the present invention.

Referring to FIG. 2, a detailed depiction of the regenerative energy management system 10 is shown. In particular, FIG. 3 is a schematic cross-sectional view of the flywheel assembly 12 in accordance with a preferred embodiment of the present invention. The flywheel assembly 12 includes a housing 34 that is axially intersected by a shaft 34. The housing 34 contains a plurality of metal windings 38 that are disposed radially about the shaft 34. The metal windings 38 preferably comprise a conductive metal wire, such that electrical current may be transmitted through the metal windings 38. The metal windings 38 are wound about a set of dielectric portions 36, which provides electrical insulation for the metal windings 38 and permits the flux of a magnetic field produced by the current in the metal windings 38.

A flywheel 30 is disposed about the shaft 34 and rotatable relative to the shaft 34. The rotation of the flywheel 30 is facilitated by a bearing assembly 42 interposed between the shaft 34 and the flywheel 30. The flywheel 30 includes a plurality of magnets 40 affixed to the flywheel 30 and located at a radial distance from the shaft 34. The magnets 40 are aligned such that they are in close proximity to the metal windings 38, thereby aiding in the electromagnetic coupling between the magnets 40 and the metal windings 38. Preferably, the magnets 40 consist of a powder metal, such as a neodymium-iron-boron compound.

FIG. 4 is a perspective view of an optimized flywheel with powder metal magnets in accordance with a preferred embodiment. As shown, the flywheel 30 is substantially disc-shaped such that the shaft 34 intersects the flywheel at its center, with the bearing assembly 42 disposed therebetween. The magnets 40 are arranged radially and symmetrically about the surface of the flywheel 30.

FIG. 5 is a partial cutaway view of the flywheel assembly 12 of the present invention. As shown, the housing 32 encloses the flywheel 30, the shaft 34 and bearing assembly 42 such that the flywheel is rotatable along either direction of a double arrow 50. The metal windings 38 are wound about dielectric portions 36, and oriented symmetrically and remotely from the shaft 34. The magnets 40 are shown in a preferred configuration about the shaft 34. In accordance with the preferred embodiment of the present invention, the flywheel 30 and magnets 40 are covered by a retention cover 44, which is preferably composed of titanium. The retention cover 44 serves to enclose the flywheel 30 and magnets 40, and to minimize the risk of a magnet becoming dislodged from the flywheel 30. In a preferred embodiment, the magnets 40 are separated from the metal windings 38 by a distance of approximately 1 millimeter, including the space assumed by the retention cover 44.

The present invention provides an improved method of managing energy generated through the typical regenerative braking process. In the hybrid vehicle configuration, if a braking event is detected, the system controller 14 configures the driveline motor-generator 16 to operate in a generation mode, which entails converting the kinetic energy of the vehicle driveline 18 into electrical energy for later use.

In accordance with the present invention, the driveline motor-generator 16 is scheduled to generate electrical in the form of electrical current (not shown) curing braking. The electrical current is transmitted to the system controller 14 which, in a preferred embodiment, has integrated voltage control and inverters for efficiently controlling the flow and modulation of electrical current. The system controller 14 preferably modulates and distributes the electrical current to the flywheel assembly 12 for conversion into kinetic energy.

The flywheel assembly 12 operates in a motor mode in response to receiving the electrical current from the system controller 14 through an adapter (not shown) coupled to the metal windings 38 which, as noted, are electrically conductive. The metal windings 38 proceed to conduct the electrical current in a fashion that creates a magnetic filed through the dielectric portions 38. In response to the magnetic field created by the metal windings 38, the magnets 40 will cause the flywheel 30 to spin a first direction along the double arrow 50. Accordingly, in a large scale braking event, a large current will be generated by the driveline motor generator 16 and eventually transmitted to the metal windings 38. A corresponding large magnetic field will result in a proportionally faster angular velocity of the flywheel 30, and thus a greater amount of kinetic energy stored for reuse by the vehicle.

Conversely, the system controller 14 may invert the flow of current to the flywheel assembly 12 in order to operate the flywheel assembly 12 in a generator mode. In this instance, the system controller 14 will receive current from the flywheel assembly 12, and the flywheel assembly 14 will distribute generated current from the metal windings 38 through the adapter (not shown).

In response to the inversion of the current flow, the rotation of the magnets 40 relative to the metal windings 38 will create an induced current which will generate a second magnetic field that opposes the rotation of the flywheel 30. That is, the induced current will rotate the flywheel 30 in a second direction along the double arrow 50, thereby decelerating the flywheel 30 until it comes to rest.

The induced current is received by the system controller 14, modulated and transmitted to the driveline motor-generator which is scheduled by the system controller 14 to operate in a motor mode. Consequently, the electrical energy induced by the rotation of the flywheel 30 is utilized by the driveline motor-generator to drive the vehicle.

The regenerative energy management system of the present invention can be utilized very efficiently. For example, a vehicle with a mass of 2,000 kilograms traveling 100 kilometers per hour will generate approximately 300,000 joules in a four-second braking event using rear brakes. Therefore, for a four second period, the flywheel must be able to absorb, on average, 75,000 watts of power.

The flywheel 30 of the present invention is preferably configured such that it rotates at a maximum angular velocity, such as between 20,000 and 30,000 revolutions per minute. The constrained angular velocity of the flywheel 30 in conjunction with the limited amount of power it needs to absorb and supply back to the driveline motor-generator 16 results in a flywheel 30 that is efficient without requiring the use of expensive bearings or vacuum chambers.

The present invention as described in its preferred embodiment thus provides an efficient regenerative energy storage device in the form of a flywheel assembly electromagnetically operable as an electric motor or as an electric generator. It should be apparent to those skilled in the art that the above-described embodiment is merely illustrative j:of but a few of the many possible specific embodiments of the present invention. Numerous and various other arrangements can be readily devised by those skilled in the art without departing from the spirit and scope of the invention as defined in the following claims.

We claim:

1. A flywheel assembly comprising:
    a housing having an interior wall defining a substantially cylindrical volume;
    a shaft axially disposed within said housing and affixed thereto;
    a plurality of metal windings disposed about the interior wall remotely from said shaft, said plurality of metal windings operable in a motor mode and a generation mode, and
    a flywheel disposed uniformly about said shaft, said flywheel having a plurality of magnets disposed thereon remotely from said shaft;
    a motor-generator receiving and distributing electrical energy;
    a system controller coupled to said motor-generator and further coupled to said plurality of metal windings such that said system controller drives electrical current into and receives electrical current from said plurality of metal windings, and
    whereby said plurality of magnets is electromagnetically coupled to said plurality of metal windings such that said plurality metal windings transmit electrical current rotating said flywheel through said plurality of magnets, and further such that rotation of said flywheel induces electrical current in said plurality of metal windings.

2. The flywheel assembly of claim 1 further comprising a titanium retention cover covering said plurality of magnets and said flywheel.

3. The flywheel assembly of claim 1 wherein said system controller includes an integrated voltage control and inverter such that said integrated voltage control and inverter controls the flow of electrical current through said system controller, and further such that said system controller determines said motor mode and said generation mode of said plurality of metal windings.

4. The flywheel assembly of claim 1 wherein in said motor mode, said plurality of metal windings induce rotational motion of said flywheel through electromagnetic interaction with said plurality of magnets.

5. The flywheel assembly of claim 1 wherein in said generator mode, said plurality of metal windings have electrical current induced by the rotational motion of said flywheel through electromagnetic interaction with said plurality of magnets.

6. The flywheel assembly of claim 4 wherein in said motor mode, said plurality of metal windings receives electrical current from said system controller.

7. The flywheel assembly of claim 5 wherein in said generator mode, said plurality of metal windings distribute electrical current induced by the rotational motion of said flywheel to said system controller.

8. The flywheel assembly of claim 1 wherein said flywheel rotates at a maximum angular speed of 20,000 revolutions per minute.

9. The flywheel assembly of claim 1 wherein said flywheel rotates at a maximum angular speed of 30,000 revolutions per minute.

10. The flywheel assembly of claim 1 wherein said plurality of magnets comprise powder metals consisting of a neodymium-iron-boron compound.

11. An integrated flywheel energy management system for use in a vehicle having a vehicle drivetrain including an internal combustion engine, said integrated flywheel energy management system comprising:
    a motor-generator coupled to said vehicle drivetrain operable as a motor for driving said vehicle drivetrain, and further operable as a generator for converting the mechanical energy of said vehicle drivetrain into electrical energy;
    a system controller electrically coupled to said motor-generator, said system controller controlling the flow of electrical current to and from said motor-generator;
    a flywheel assembly including a housing, said housing defining a cylindrical volume containing a flywheel having a plurality of magnets radially disposed and electromagnetically coupled to a plurality of metal windings, said metal windings disposed on an inner surface of said housing and electrically coupled to said system controller, and
    whereby said motor-generator generates and distributes electrical energy to said system controller in a generation mode, and wherein said system controller utilizes said electrical energy to drive a current through said plurality of metal windings such that said flywheel rotates in response to a first induced current in said plurality of magnets, and
    whereby in a motor mode, said plurality of metal windings receives a second induced current in response to the rotation of said flywheel, and said second induced current is transmitted through said system controller to said motor-generator such that said motor-generator drives said vehicle drivetrain.

12. The integrated flywheel energy management system of claim 11 wherein said system controller includes integrated voltage control and inverters.

13. The integrated flywheel energy management system of claim 11 further comprising a titanium retention cover disposed about and substantially covering said flywheel.

14. The integrated flywheel energy management system of claim 11 wherein said flywheel rotates at a maximum angular speed of 20,000 revolutions per minute.

15. The integrated flywheel energy management system of claim 11 wherein said flywheel rotates at a maximum angular speed of 30,000 revolutions per minute.

16. The integrated flywheel energy management system of claim 11 wherein said plurality of magnets comprise powder metals consisting of a neodymium-iron-boron compound.

* * * * *